United States Patent
Kanai et al.

(10) Patent No.: US 7,058,770 B2
(45) Date of Patent: Jun. 6, 2006

(54) METHOD AND APPARATUS FOR CONTROLLING THE RECORDING OF DIGITAL INFORMATION, BY USING UNIT MANAGEMENT TABLE

(75) Inventors: Yuichi Kanai, Moriguchi (JP); Yoshihiro Hori, Moriguchi (JP); Ryoji Ohno, Osaka (JP); Takeo Ohishi, Yokohama (JP); Kenichiro Tada, Tokyo (JP); Tatsuya Hirai, Tokyo (JP); Jun Kamada, Kawasaki (JP)

(73) Assignees: Sanyo Electric Co., Ltd., Osaka (JP); Sharp Corporation, Osaka (JP); Victor Company of Japan, Limited, Yokohama (JP); Pioneer Corporation, Tokyo (JP); Hitachi, Ltd., Tokyo (JP); Fujitsu Limited, Kanagawa (JP)

( * ) Notice: Subject to any disclaimer, the term of this patent is extended or adjusted under 35 U.S.C. 154(b) by 305 days.

(21) Appl. No.: 10/675,994

(22) Filed: Oct. 2, 2003

(65) Prior Publication Data

US 2004/0105331 A1 Jun. 3, 2004

(30) Foreign Application Priority Data

Oct. 2, 2002 (JP) ............................. 2002-290440

(51) Int. Cl.
*G06F 12/00* (2006.01)

(52) U.S. Cl. ........................ 711/156; 711/111; 711/121
(58) Field of Classification Search ................ 711/156, 711/111, 221
See application file for complete search history.

(56) References Cited

U.S. PATENT DOCUMENTS

| 5,832,526 | A | * | 11/1998 | Schuyler ...................... 707/205 |
| 6,098,148 | A | * | 8/2000 | Carlson ....................... 711/112 |
| 6,118,927 | A | * | 9/2000 | Kikuchi et al. ................ 386/95 |
| 6,389,509 | B1 | * | 5/2002 | Berenguel et al. .......... 711/113 |
| 6,505,213 | B1 | * | 1/2003 | Kamada et al. ............. 707/200 |
| 6,604,181 | B1 | * | 8/2003 | Moriya ........................ 711/170 |
| 6,816,666 | B1 | * | 11/2004 | Kanai et al. .................. 386/52 |
| 2005/0283673 | A1 | * | 12/2005 | Ode ............................ 714/31 |

* cited by examiner

FOREIGN PATENT DOCUMENTS

JP  11-134238  5/1999

OTHER PUBLICATIONS

"Universal Disk Format (UDF) Specification, Revision 2.01" Optical Storage Technology Association, www.osta.org, title page, pp. 14-16 and 27-29, Section 2.1.5 "Entity Identifier" and Section 2.2.6.4. "byte ImplementationUse," Mar.15, 2000.*

*Primary Examiner*—Stephen C. Elmore
(74) *Attorney, Agent, or Firm*—McDermott Will & Emery LLP

(57) ABSTRACT

A recording area of a hard disk is managed by units. Each unit comprises physically continuous recording regions having predetermined size, and usage status of the unit is stored in an allocation unit (AU) management table. Data requiring a real time processing is stored in each unit. When the usage status of the unit is changed or modified due to the recording or deletion of data, the AU management table is updated and then information indicative of the fact that the AU management table has been updated is recorded. An apparatus where the final change is made is detected at the time the hard disk is inserted or a file system is initialized. And if the apparatus which last made the change adopts the file system which does not use the AU management table, then the table is reconfigured so as to retain the consistency of the AU management table.

19 Claims, 12 Drawing Sheets

METHOD AND APPARATUS FOR CONTROLLING THE RECORDING OF DIGITAL INFORMATION, BY USING UNIT MANAGEMENT TABLE

BACKGROUND OF THE INVENTION

1. Field of the Invention

The present invention relates to the recording control technology, and it particularly relates to a technology in which a recording region in the recording medium is managed in units of a recording region, each unit having a predetermined size with contiguous logical addresses.

2. Description of the Related Art

Thanks to the recent advancement of IT (Information Technology), the audio/video data (hereinafter referred to as "AV data" also) are recorded, as digital data, in the recording media such as CDs (Compact Disc) and DVDs (Digital Versatile Disc) and one can enjoy the AV data by reproducing them. The recording method by use of the digital data is advantageous in that the tone and image quality thereof is superior compared to the conventional analog recording and almost no degradation is caused. Though the analog-recorded musical data are still favored by the small group of people, the field of the musical data are now almost completely taken over by the digitally recorded CDs, DVDs and so forth.

As for the video data as well, the digital-based recording/reproducing method as in DVDs or the like is widely spreading among users who seek higher tone and image quality. Spurred by the recent trend in the digitization of the television broadcast, the public attention is focused on the digital recording/reproducing technology using the mass-storage magnetic recording disks such as DVDs and hard disks, instead of the conventional video tapes and the like.

The UDF (Universal Disk Format) which can handle the mass-storage disks storing the large-capacity files such as video data is on its way to the wider acceptance as a file system that guarantees the disk exchange between computer systems. For details, see e.g. OSTA:Optical Storage Technology Association, "Universal Disk Format Specification Revision 2.01"<http: www.osta.org/specs/pdf/udf201.pdf>. By using the UDF, the storage modes and data management methods for the media such as CDs, DVDs and hard disks are standardized, so that the data exchange among different hardware, software, operating systems and so forth can be smoothly carried out.

When the AV data acquired from the broadcast wave are recorded on the media, the AV data are transmitted at a predetermined bit rate and therefore need to be written in sequence. Moreover, when the recorded AV data are to be reproduced, the AV data must be supplied at a predetermined bit rate. Otherwise, the reproduced images suffer distortion or the like. Thus, the data must be read out continuously so as not to cause delay. However, since the UDF is not formed on the presumption that the data requiring such real time processing is recorded and reproduced, there is a need of developing a new technology by which to guarantee the real time processing.

SUMMARY OF THE INVENTION

The present invention has been made in view of the foregoing circumstances and an object thereof is to provide a technology suitable for the recording of data where the real time processing thereof plays an important and crucial role and is emphasized accordingly. Another object of the present invention is to provide apparatus capable of recording and reproducing the data in real time and at same time retaining the compatibility with the existing recording apparatuses.

A preferred embodiment according to the present invention relates to a recording control apparatus. This apparatus comprises: a processing unit for writing or deleting data on a recording medium having a unit management table for managing usage status of units of a recording region, each unit having a predetermined size with contiguous logical addresses; an updating unit which updates the unit management table in the event that the usage status of the unit is changed by the writing or deleting the data performed by the processing unit; an updated apparatus information recording unit which records, on the recording medium, apparatus information indicating that an apparatus having performed the writing or deleting the data has a function of updating the unit management table; a detector which detects, when connected to the recording medium, whether an apparatus that last performed the writing or deleting the data has the function of updating the unit managing table or not by reading out the apparatus information recorded by the updated apparatus information recording unit; and a reconstructing unit which reconstructs the unit management table if the apparatus that last performed the writing or deleting the data does not have the function of updating the unit management table.

The size of the unit may be determined based on performance of the recording medium so that a processing of data, where continuous write or read thereof in time is required, is performed without any loss of data continuity incurred during the continuous write or read operations. If data storage regions are located, in a scattered and dispersed manner, in the recording region, the longer access time is caused and thus the real-time processing may not be properly achieved. For that reason, physically continuous recording regions are secured in advance so as to realize high-speed data writing and reading.

When data requiring continuous write are to be recorded, the processing unit may detect an unused unit by referring to the unit management table and may record the data in the unused unit. Thus, unused unit or units can be detected quickly and the data can be continuously recorded. In order that the usage status of a unit management table be synchronized with that of an actual recording region, the unit management table needs to be updated whenever the data is recorded to or deleted from the unit. However, if the data are recorded or deleted by an apparatus which does not have this facility, mismatching or inconsistency is caused in the contents of the unit management table. The reconstructing unit is provided to avoid and correct such inconsistency. The reconstructing unit may reconstruct the unit management table by referring to actual usage status of the recording region.

Since it is not efficient if the unit management table is reconstructed whenever the recording medium is connected, information on apparatus which last updated the contents of the recording medium is recorded in order to determine whether or not to reconstruct the unit management table. It suffices that the unit management table is reconstructed only when the apparatus which last updated the contents belongs to the class of apparatus that does not update the unit management table. In this manner, the consistency of the unit management can be efficiently retained.

The recording medium may be a hard disk and each unit may comprise a plurality of blocks in which data are input and output, each block having continuous logical addresses.

The recording medium may further include a region management table for managing usage status of the blocks, and the reconstructing unit may reconstruct the unit management table in a manner such that the usage status of the blocks of a respective unit is obtained by referring to the region management table. The hard disk may be formatted according to the UDF.

Another preferred embodiment according to the present invention relates to a recording medium. On this recording medium, recorded is management information including: a unit management table for managing usage status of units of a recording region, each unit having a predetermined size with contiguous logical addresses; and apparatus information indicative of whether an apparatus that last updated the recording region has a function of updating the unit management table or not.

Still another preferred embodiment according to the present invention relates to a recording control method. This method includes: writing data to or deleting data from a recording medium having a unit management table recorded thereon, for managing usage status of units of a recording region, each unit having a predetermined size with contiguous logical addresses; updating the unit management table in the event that the usage status of the unit is changed by the writing or deleting; recording, on the recording medium, information indicating that the unit management table has been updated; reading out, prior to using the recording medium, the information recorded in the recording, and detecting whether an apparatus that last performed the writing or deleting has updated the unit management table or not; and reconstructing the unit management table if the apparatus that last performed the writing or deleting has not updated the unit management table.

It is to be noted that any arbitrary combination of the above-described structural components and expressions changed between a method, an apparatus, a system, a computer program, a data structure, a recording medium and so forth are all effective as and encompassed by the present embodiments.

Moreover, this summary of the invention does not necessarily describe all necessary features so that the invention may also be sub-combination of these described features.

DETAILED DESCRIPTION OF THE INVENTION

Figure 1:
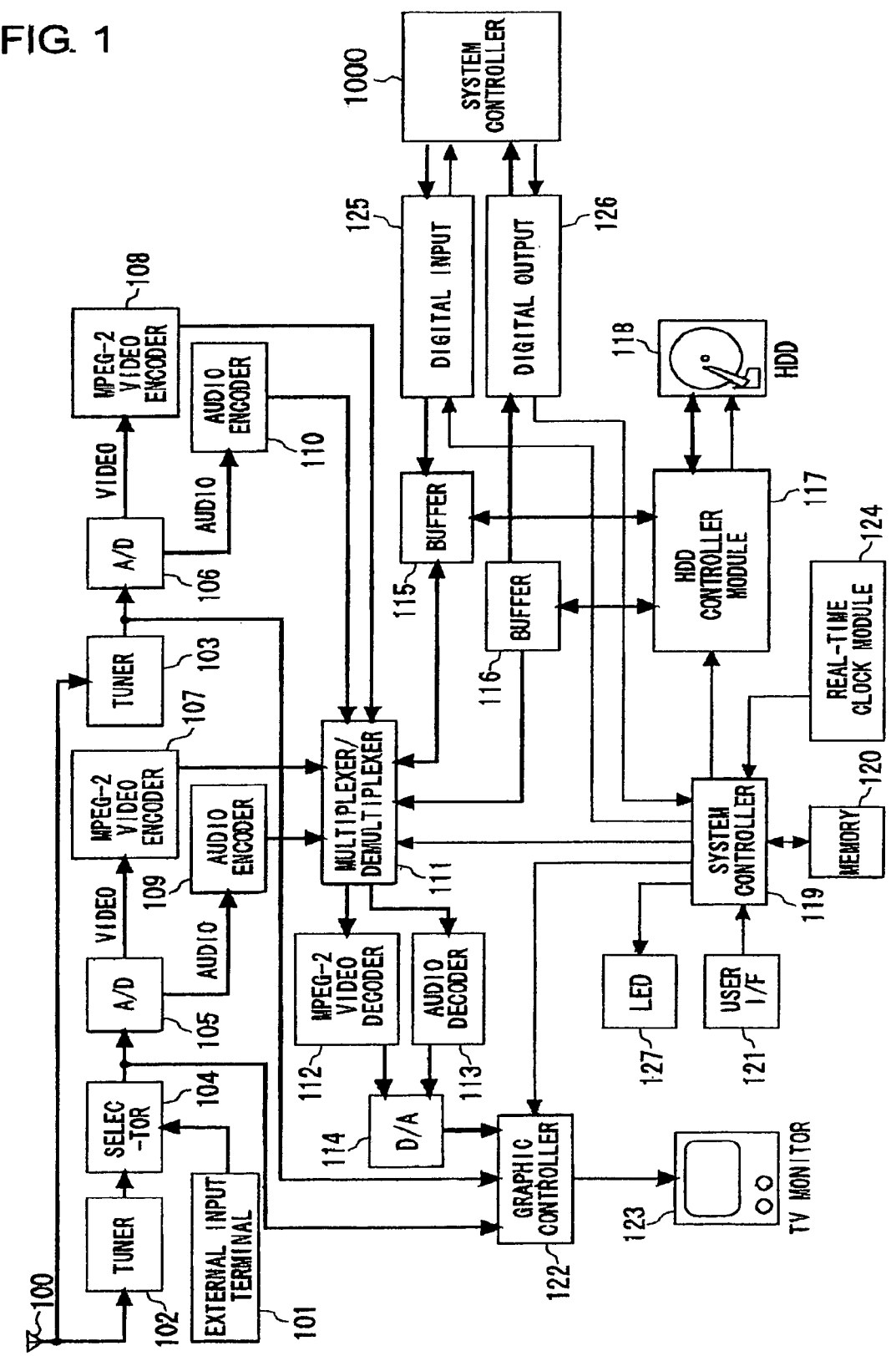
FIG. 1 shows a structure of a digital recording/reproducing apparatus according to one embodiment of the present invention.

The invention will now be described based on the following embodiments which do not intend to limit the scope of the present invention but exemplify the invention. All of the features and the combinations thereof described in the embodiments are not necessarily essential to the invention.

In a digital recording/reproducing apparatus according to the present embodiment, a hard disk is used as a recording medium for recording and storing audio/video data. The AV data need to be recorded or reproduced continuously at a predetermined bit rate of a format used then, thus requiring a real time processing. Such data in which the real time processing plays the important and crucial role and is emphasized accordingly will be hereinafter simply referred to as "real time data". Normal data where the real time processing is not particularly emphasized will be hereinafter simply referred to as "non-real time data."

If recording regions that store the real time data thereon are located in a scattered and dispersed manner on a disk, the access is made to the addresses which are scattered around on the disk, so that the seek time and/or rotation-wait time is often caused during the recording or reproduction and the writing and reading of data might not be carried out in time. Thus, in order to guarantee the real time processing, a recording region where logical addresses are contiguous needs to be secured so as to be able to perform the writing and reading continuously by storing the real time data. Here, a recording region, where a logical address or logical block address (LBA) used when a host accesses the recording medium is continuous, is regarded as a physically continuous recording region, so that it is assumed that the seek time or rotation-wait time is not caused. In the present embodiments, a unit of this continuous recording region is called a "unit" or "AU (Allocation Unit)", and the real time data are stored for each unit. And there is provided an AU management table by which to manage the usage status of the units, and the real time data are recorded by referring to the AU management table. In the hard disk, input/output is generally performed for each block (sector) having a predetermined length of continuous recording region, and the unit includes a predetermined number of blocks.

The digital recording/reproducing apparatus according to the present embodiment manages the usage status of the units by updating the AU management table every time data is recorded, edited or deleted on the hard disk. In the conventional practice, the hard disk is, in most cases, provided fixedly in apparatus such as a personal computer. In recent years, detachable hard disk drives became available and thus the hard disks can be used as removable media, similar to CDs and DVDs, which can be easily carried to anywhere and can be compatible and shared with other devices. If such freely detachable hard disks are implemented, it is possible to use the hard disk by connecting it to the existing recording/reproducing apparatus. Then, if data are recorded or deleted on this hard disk by another recording apparatus which does not adopt and support the same method, the recording apparatus does not update the AU management table, so that there is caused mismatching and inconsistency in the usage status between the AU management table and actual unit.

In order to resolve the above problem, according to the present embodiment, whether or not the data are recorded or deleted by a recording apparatus that adopts the other methods is detected, and if so, the synchronism between the usage status of the AU management table and the actual unit is retained by reconstructing the AU management table. As a result thereof, the hard disk can be properly managed for each unit and, at the same time, the compatibility with a recording apparatus that adopts the existing file system is maintained. According to the present embodiments, the above-mentioned recording and reproducing method is realized in a manner to extend the UDF in the light of compatibility with the UDF.

FIG. 1 shows a structure of a digital recording/reproducing apparatus according to an embodiment of the present invention. Referring to FIG. 1, signal lines indicated by thick lines represent the flow of video or audio data while those by thin lines represent the flow of control signals.

The digital recording/reproducing apparatus is comprised of an antenna 100, an external input terminal 101, tuners 102 and 103, a selector 104, A-D converters 105 and 106, MPEG-2 video encoders 107 and 108, audio encoders 109 and 110, a multiplexer/demultiplexer 111, an MPEG-2 video decoder 112, an audio decoder 113, a D-A converter 114, buffer memories 115 and 116, a hard disk drive controller module 117, a hard disk drive 118, a system controller 119, a memory 120, a user interface 121, a graphic controller 122, a television monitor 123, a real-time clock module 124, a digital input 125, a digital output 126 and an LED 127.

The signals of television broadcast, for example, received by the antenna 100 are commonly supplied to the tuners 102 and 103. The first tuner 102 selects signals of a channel specified by a user from the signal received by the antenna 100, then demodulates the selected signals to analog television signals comprised of video signals and audio signals, and supplies the demodulated signals to the selector 104. To the external input terminal 101 the various external television signal sources such as video tape recorder (VTR) and camcorder can be connected, and the signals inputted from the external input terminal 101 are supplied to the selector 104. The selector selects either an output from the first turner 102 or an input from the external input terminal 101 so as to be supplied to the A-D converter 105, and supplies it to one of inputs of the graphic controller 122. Generally, if some kind of external signal source is connected to the external input terminal 101, the input from the external input terminal 101 is selected whereas, if not connected, the output of the tuner 102 is selected.

The A-D converter 105 converts the video signals and the audio signals of the analog television signal outputted from the selector 104 into digital signals, respectively, and sends the digital video signals to the MPEG-2 video encoder 107, and at the same time sends the digital audio signals to the audio encoder 109. The MPEG-2 video encoder 107 compresses the thus supplied digital video signals and sends the compressed video signals to the multiplexer/demultiplexer 111, and the audio encoder 109 compresses the thus supplied digital audio signals and sends the compressed audio signals to the multiplexer/demultiplexer 111. The multiplexer/demultiplexer 111 multiplexes the video stream and audio stream supplied, and converts them into an MPEG-2 system stream.

The second tuner 103 selects from the signals received by the antenna 100 the signals belonging to a single channel specified by the user, and demodulates it to the analog television signals composed of the video signals and the audio signals, and sends the demodulated signals to the A-D converter 106, and at the same time sends the demodulated signals to another input of the graphic controller 122. The A-D converter 106 converts the video signals and the audio signals of the analog television signals outputted from the tuner 103 into digital signals, respectively, and sends the digital video signals to the MPEG-2 video encoder 108, and at the same time sends the digital audio signals to the audio encoder 110. The MPEG-2 video encoder 108 compresses the thus supplied digital video signals and sends the compressed video signals to the multiplexer/demultiplexer 111, and the audio encoder 110 compresses the thus supplied digital audio signals and sends the compressed audio signals to the multiplexer/demultiplexer 111. The multiplexer/demultiplexer 111 multiplexes the video stream and audio stream supplied, and converts them into the MPEG-2 system stream.

As an example of randomly accessible recording media, there is a hard disk which is integrated into a hard disk drive (hereinafter referred to as "HDD" also) 118. This HDD 118 is freely and removably installed in this digital recording/reproducing apparatus. In what is to follow, this HDD 118 as a unit by itself is, for convenience, regarded as a recording medium which is both rewritable and readable. Writing data to the HDD 118 and reading data from the HDD 118 are executed by the HDD controller module 117, as will be described later.

Between the above-mentioned multiplexer/demultiplexer 111 and the HDD controller module 117, there is provided a dual-system data channel which is comprised of a first data bus covering and containing the buffer memory 115 and a second data bus covering and containing the buffer memory 116. Moreover, digital data from other externally connected apparatus can be inputted to the buffer memory 115 through the digital input. On the other hand, digital data in the buffer memory 116 can be outputted to other externally connected apparatus through the digital output 126. Thus, as will be described later, the MPEG-2 system stream data are exchanged, via the buffer memories 115 and 116, among the multiplexer/demultiplexer 111, the HDD controller module 117, the digital input 125 and the digital output 126.

The multiplexer/demultiplexer 111 demultiplexes the MPEG-2 system stream received from the buffer memories 115 and 116 into the video stream and the audio signal steam, and sends the former to the MPEG-2 video decoder 112 and the latter to the audio decoder 113. The MPEG-2 video decoder 112 decodes the thus supplied video stream and sends it to the D-A converter 114. The audio decoder 113 decodes the audio stream supplied and sends it to the D-A converter 114. The D-A converter 114 converts each of the sent signals into an analog signal, and sends the analog television signal composed of the video signal and the audio signal to yet another input of the graphic controller 122. The graphic controller 122 selects any one of the analog television signals sent respectively from the selector 104, the second tuner 103 and the D-A converter 114, and sends the thus selected signals to the television monitor 123 which is connected externally to the digital recording/reproducing apparatus. Operations of the multiplexer/demultiplexer 111 and the graphic controller 122 are controlled by control signals supplied from the system controller 119.

When this digital recording/reproducing apparatus is connected to other external device or devices via the digital input 125 and the digital output 126, the control signal from the system controller 119 is sent via the digital input 125 (thin line), to a system controller 1000 of the other device, and a control signal from the system controller 1000 is sent via the digital output 126 (thin line) to the system controller 119 of this recording/reproducing apparatus. Connected to the system controller 119 are the user interface 121, the memory 120 and the real-time clock module 124.

Basic operational principles of recording, deleting and the like by the digital recording/reproducing apparatus shown in FIG. 1 will be described in detail later in relation to a method of recording a file to the hard disk drive 118.

Figure 2:
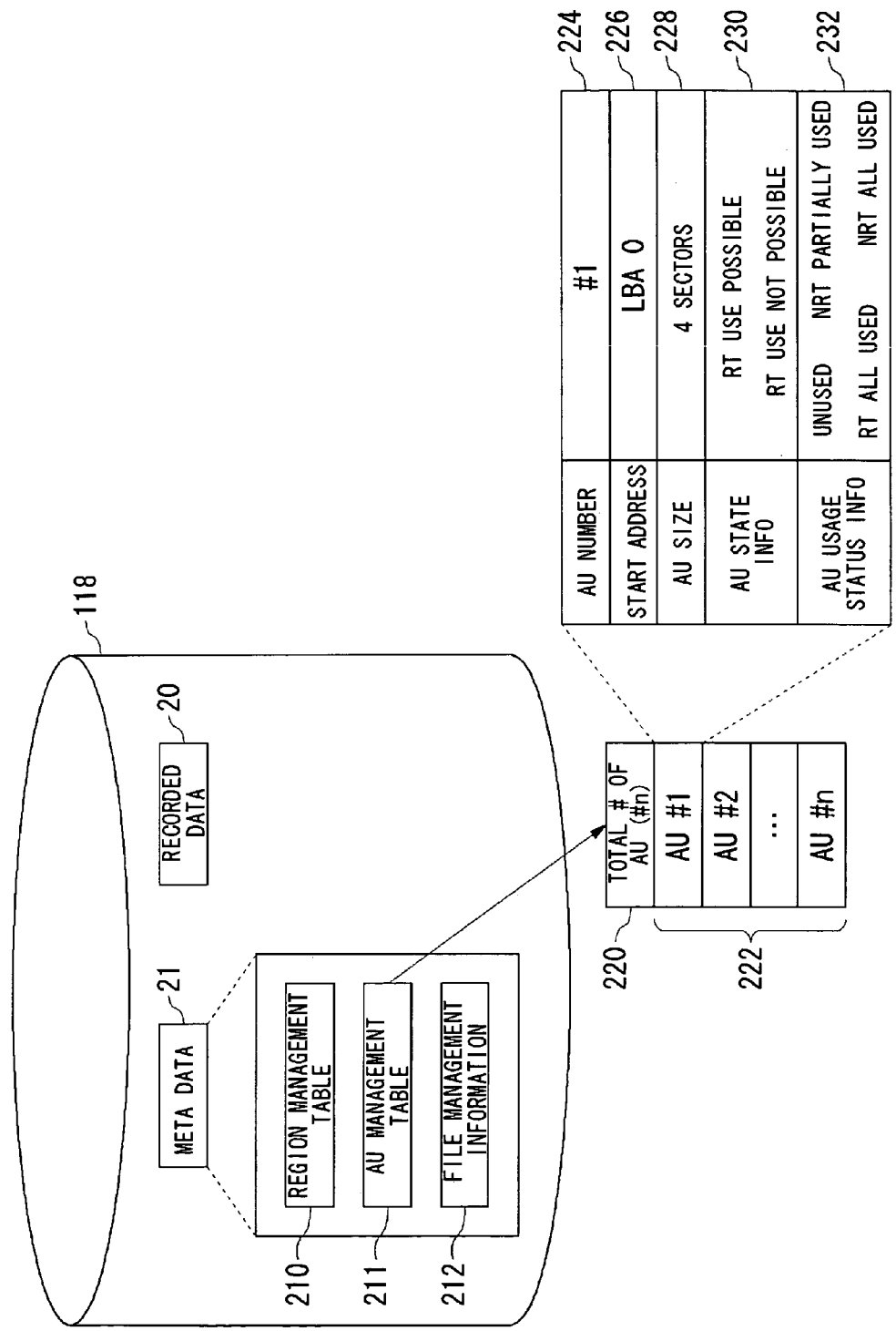
FIG. 2 shows the types of information recorded in a hard disk and a structure of an AU management table.

FIG. 2 shows the types of information recorded in the hard disk and a structure of an AU management table. Where data is recorded as a file on the hard disk which is a recording medium, data itself, such as video or audio, to be recorded (hereinafter referred to as "recording data" 20) and management information (hereinafter referred to as "metadata" 21) which is necessary for the main data 20 to be constituted as a file are recorded on the hard disk. The metadata 21 is composed of three types of information, that is, a region management table 210, an AU management table 211 and file management information 212. The metadata 21 is generated at the first operation of the recording medium and is updated every time data is recorded, edited or deleted.

The AU management table 211 contains a total-number-of AU column 220 and an AU information column 220 provided for each of a plurality of AUs. For each of the plurality of AUs in the AU information column 222, there are provided an AU number column 224, a start address column 226, an AU size column 228, an AU state information column 230 and an AU usage status information column 232. The AU number column 224 stores the number by which an AU is uniquely identified. The start address column 224 stores a logical block address (LBA) of the AU located at the top thereof. The AU size column 228 stores the size of AU in units of sector. In this example, a single AU consists of four sectors. When the writing and reading of real time data is continuously carried out at a predetermined bit rate, the size of AU is set to the degree that the real time processing is guaranteed. Since the seek time, rotation-wait time and the like differ by the performance of a hard disk used then, the size of AU may be determined for each hard disk used. For example, if a hard disk is used whose seek time and rotation-wait time is long, it is desirable that the size of AU be set to a larger size.

Here, an example of methods for calculating the AU size and a buffer amount that the application shall prepare for is described. Suppose that information on performance and so forth of a hard disk is indicated on the hard disk in a predetermined position thereof before the shipping of the hard disk. By issuing a command by which to inquire of a hard disk about information indicative of performance of the hard disk, pre-recorded information on the hard disk can be acquired. Based on this information, the AU size and the buffer amount that the application shall prepare for are calculated.

The AU size is denoted by Usize, a write or read rate of a hard disk by Bhdd, wait time by Tw, a transfer rate between a hard disk and a host by Bif, and the maximum bit rate used by application by Bsys. Here the wait time Tw is calculated by considering the maximum seek time, command-wait time, rotation-wait time and so forth. If the HDD-host transfer rate Bif is sufficiently higher than the write or read rate of a hard disk Bhdd, then the write or read in the hard disk is the limiting factor. Thus, a condition of the necessary AU size for which the real time processing is guaranteed is to satisfy the following inequality:

$$\frac{Usize}{\frac{Usize}{Bhdd}+Tw} \langle Bsys$$

A buffer amount C that the application shall prepare for is such that $$C \rangle \frac{Bhdd - Bsys}{\frac{Usize}{Bhdd}}$$

If the HDD-host transfer rate Bif is lower than the write or read rate of a hard disk Bhdd, then the HDD-host transfer is the limiting factor. Thus, a condition of the necessary AU size for which the real time processing is guaranteed is to satisfy the following inequality:

$$\frac{Usize}{\frac{Usize}{Bif}+Tw} \langle Bsys$$

The buffer amount C that the application shall prepare for is such that $$C \rangle \frac{Bif - Bsys}{\frac{Usize}{Bif}}$$

However, the above inequalities could only be valid if the application consumes the information in the averaging manner. And if an application consumes the information intermittently, too, it is preferable that additional buffers be prepared as a spare at the application side.

The AU state information column 230 stores a state of the AU. More specifically, the AU state information column 230 stores information indicative of whether the AU can be used to store the real time data or not. A recording region or a storage region which is continuous and has a predetermined size is regarded as a single unit. If the region contains therein a defect which cannot be used, a substitute region is normally provided and secured within a reserve region. The unit having such a defect cannot be accessed continuously by one-time seek, so that an overhead is caused when access is made to the substitute region. Thus, according to the degree of severeness of the defect, a store process is performed after it is judged whether or not the unit can be used to store the real time data.

The AU usage status information column 232 stores information indicative of usage status of an AU. More specifically, the AU usage status includes the status of being "unused", "RT (Real Time) all used", "NRT (Non-Real Time) partially used", "NRT all used". The term "unused" refers to status in which all of blocks included in a unit can be recorded and stored. The term "RT all used" refers to status in which all of blocks included in a unit are being used continuously for recording and storing the real time data. The term "NRT partially used" refers to status in which part of blocks included in a unit is being used for recording and storing the non-real time data. The term "NRT all used" refers to status in which all of blocks included in a unit are being used for recording and storing the non-real time data. The "unit" is the minimum region required for performing a real time processing, and the real time data is recorded in units of "unit", that is, unit by unit. Thus, the status of being "RT partially used" is nonexistent. Moreover, the real time data and the non-real time data never exist mixedly within the same unit. Thus, if the unit is "NRT partially used", the remaining blocks can store the non-real time data only.

Figure 3:
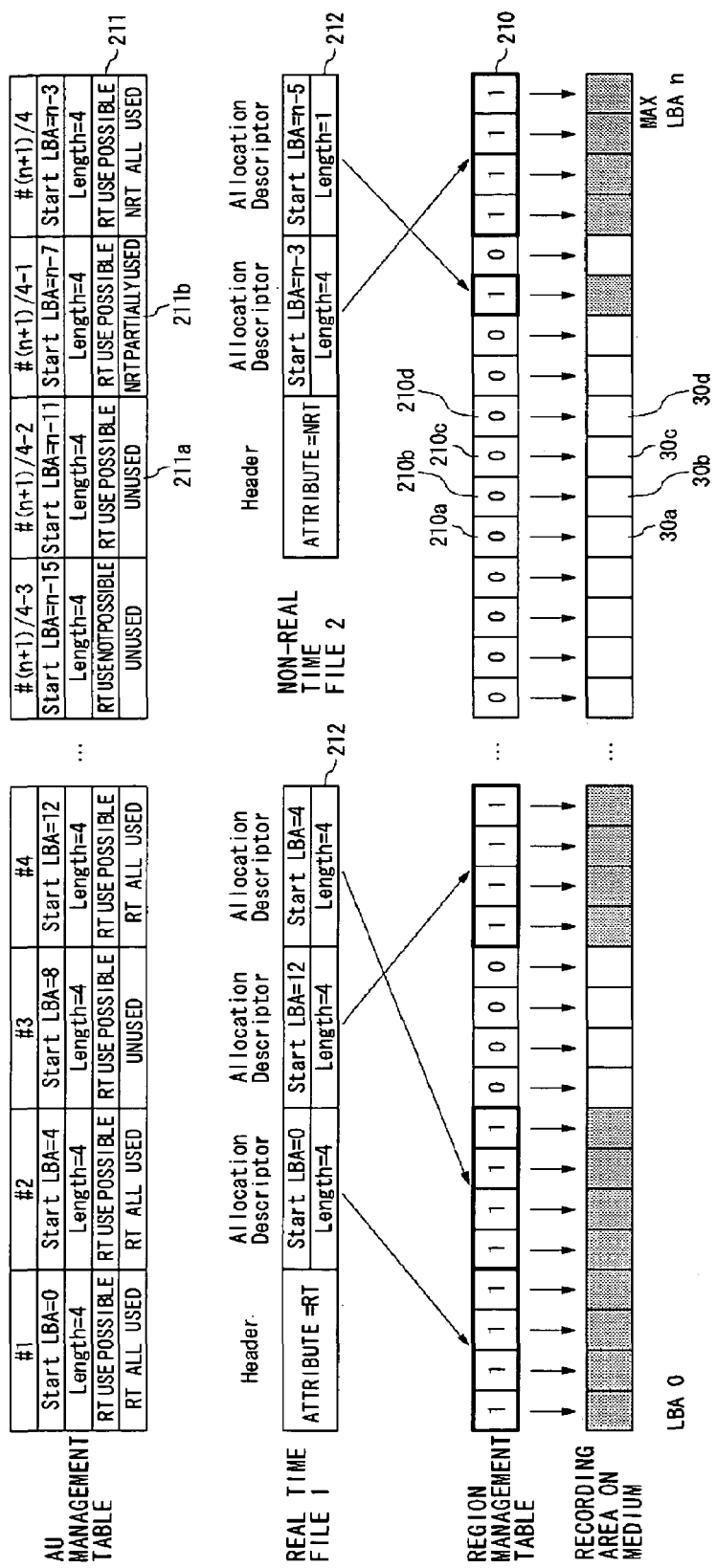
FIG. 3 illustrates a recording method using an AU management table according to the present embodiment.

FIG. 3 illustrates a recording method using an AU management table according to the present embodiment. A region management table 210 manages the usage status of each block (sector). The region management table 210 corresponds to a "Space Bitmap Descriptor" in the UDF. Entries 210a, 210b, 210c, 210d, . . . included in the region management table 210 correspond to blocks 30a, 30b, 30c, 30d, . . . , respectively. In response to the usage status of a block, "1" is set when the block is in use while "0" is set when the block is not in use.

The AU management table 211 regards the recording region of the HDD 118 as an address space which is divided into units, and assigns unit numbers to the divided units in sequence so as to manage the usage status of each of the units. The AU table 211 is composed of entries 211a, 211b and so forth. For example, the entry 211a is the entry of the unit containing the blocks corresponding to the entries 210a, 210b, 210c and 210d on the region management table 210, and stores the management information of this unit.

File management information 212 is information by which to manage the recording data 20 for each file. Header information and allocation descriptor are recorded in the management information 212 of a file corresponding to the recording data 20. The header information contains attribute information on the file, and the information indicates whether the recording data 20 is data to be processed in real time or not. The allocation descriptor contains link information of a block included in the recording data 20, and the information on the start address and the size of a block are recorded in the order in which they are referenced.

The recording data 20 to be processed in real time, such as the MPEG-2 system stream generated by the multiplexer/demultiplexer 111 are stored, in a real time file 1, as the data in units of the above-mentioned unit. Thus, the total capacity of the real time file 1 must be necessarily an integer multiple of the unit capacity. Also, in the HDD 118 where data is stored block by block, the start address of the real time file 1 must be an address that represents the boundary of a unit. This is because the storage space is regarded as the unit-by-unit address space in the AU management table 211. Link information on blocks included in the unit is stored in the file management information 212 that indicates the file structure of this real time file 1.

In the case of a non-real time file 2, the recording data 20 which does not require the real time processing is stored as data in units of block. Thus, the total capacity of this non-real time file 2 is an integer multiple of the block unit capacity. Moreover, in the file management information 212 showing a file structure of the non-real time file 2, the link information of the block which the non-real time file 202 is assigned to is recorded in the similar manner to the case of the real time file 1.

Figure 4:
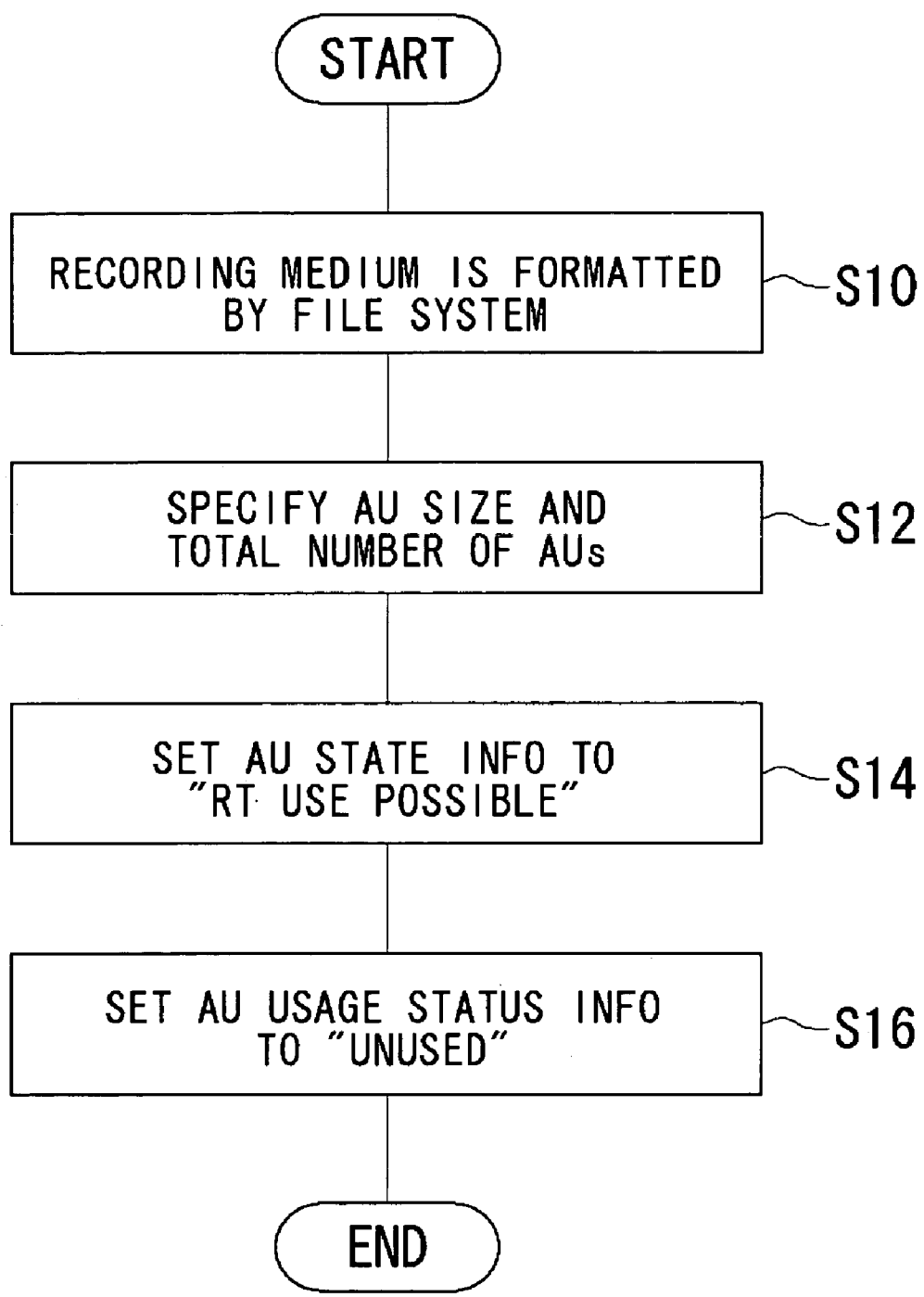
FIG. 4 is a flowchart showing a procedure of formatting a medium in a digital recording/reproducing apparatus according to the present embodiment.

FIG. 4 is a flowchart showing a procedure of formatting a medium in a digital recording/reproducing apparatus according to the present embodiment. When an unformatted hard disk is connected to the digital recording/reproducing apparatus or a user instructs formatting the hard disk, an active file system in the system controller 119 formats the HDD 118 to the UDF (S10). At this time, the AU size and the total number of AUs are determined based on the capacity, performance or the like of the HDD 118 (S12). Thereafter, prepared in the HDD 118 is the metadata 21 which includes the region management table 210, the AU management table 211 and the file management information 212. In the AU state information column of the AU management table 211, "RT use possible" is set as an initial value (S14) whereas in the AU usage status information column thereof, "unused" is set as an initial value (S16). As a result, the HDD 118 is initialized and, thereafter, can be operated and used by the digital recording/reproducing apparatus according to the present embodiment. If any defect is found in the recording region, there may be a case where the AU state information for the AU that contains the defect is set to "RT use not possible".

Figure 5:
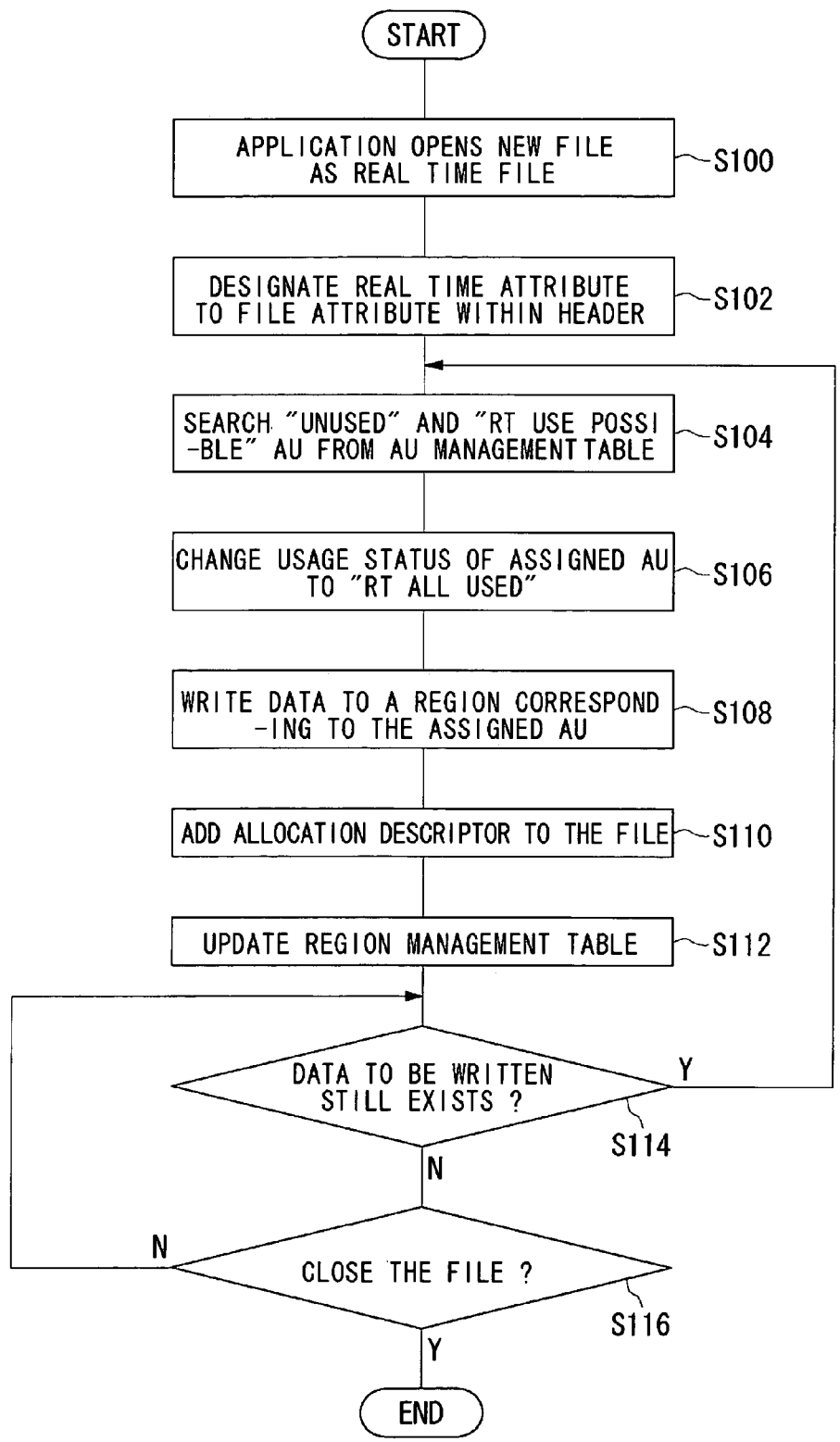
FIG. 5 is a flowchart showing a procedure of recording real time data in a digital recording/reproducing apparatus according to the present embodiment.

FIG. 5 is a flowchart showing a procedure of recording the real time data in the digital recording/reproducing apparatus according to the present embodiment. First, when application opens a new file as a real time file (S100), a real time attribute is designated in a file attribute within a header located at the top of the real time file (S102). The HDD controller module 117 searches an AU, which is unused and RT use possible, by referring to the AU management table 211 (S104), then assigns the AU obtained as a result of the search to an object to be recorded, and then changes to "RT all used" the AU usage status information column 232 of the AU management table 211 corresponding to this AU (S106). By implementing the AU management table 211, an AU where data is recordable can be rapidly searched, so that the real time processing can be performed. Thereafter, the HDD controller module 117 writes the data of the real time file to a block included in this AU (S108). At this time, the start address as well as the size of the data-written block is added to an allocation descriptor of the file management information 212 (S110). Moreover, an entry of the region management table 210 corresponding to the block included in this AU is updated to "1" indicating being "in use". Next, it is judged whether any data to be recorded still remains or not (S114); if the data to be recorded still exists (Y of S114), the procedure is returned to S104 and repeats the processing which records the data to the AU obtained by the search. If data to be recorded is no longer left (N of S114), the file is closed (S116) and the processing is terminated.

Figure 6:
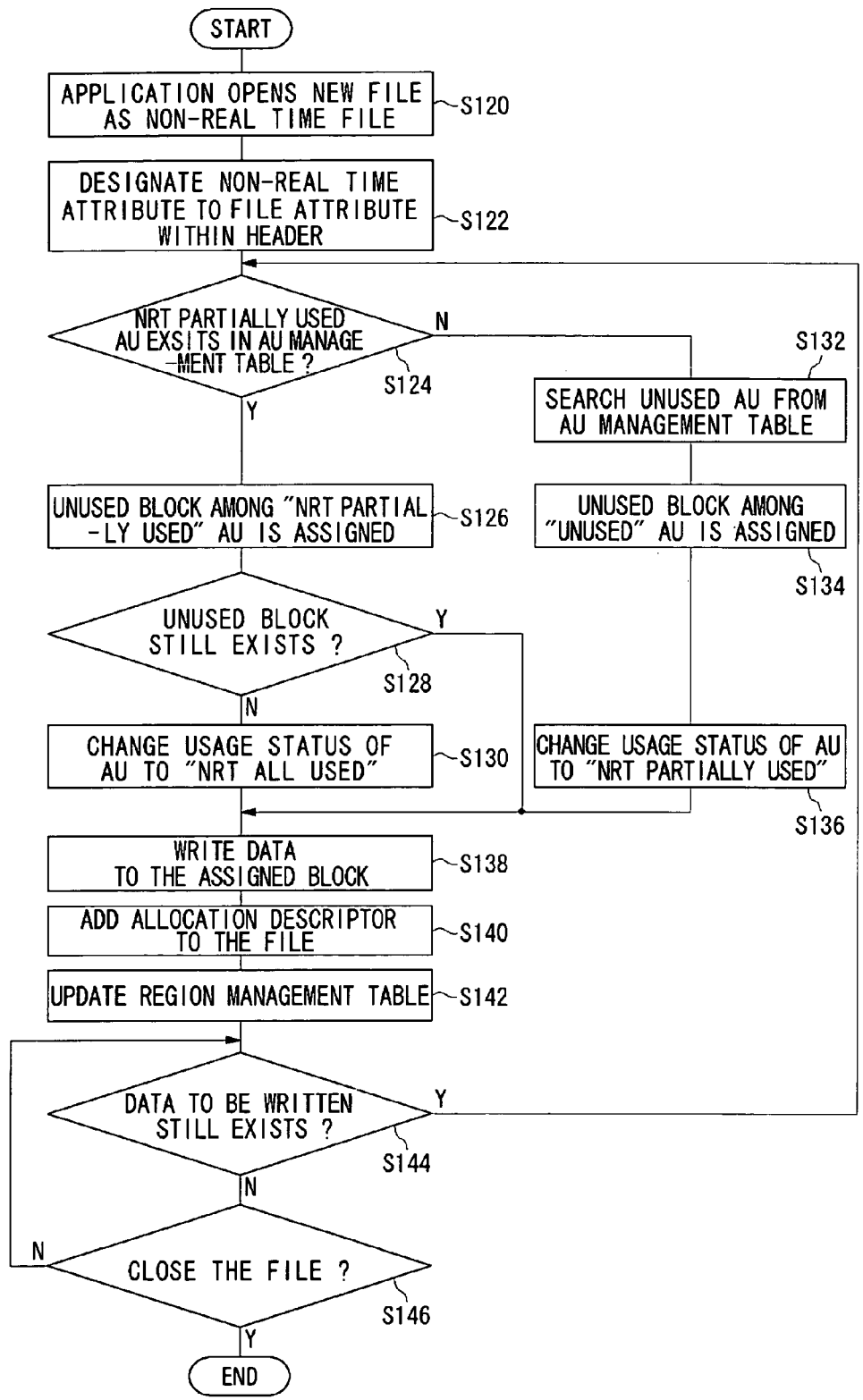
FIG. 6 is a flowchart showing a procedure of recording non-real time data in a digital recording/reproducing apparatus according to the present embodiment.

FIG. 6 is a flowchart showing a procedure of recording non-real time data in the digital recording/reproducing apparatus according to the present embodiment. First, when application opens a new file as a non-real time file (S120), a non-real time attribute is designated in a file attribute within a header located at the top of the non-real time file (S122). The HDD controller module 117 searches whether there exists an AU, which is NRT partially used, by referring to the AU management table 211 (S124). If there exists an AU which is NRT partially used (Y of S124), then an unused block among the blocks included in the AU obtained as a result of the search is searched by referring to the region management table 210 and is assigned to an object to be recorded (S126). If all of blocks in this AU become "in use" by recording data to this block (N of S128), then the AU usage status information column 232 of the AU management table 211 corresponding to this AU is changed to "NRT all used" (S130), and data of non-real time file is written to the thus assigned block (S138). If there exists any unused block (Y of S128), the data is written without altering the usage status of the AU (S138).

If there does not exist any NRT partially used AU in the AU management table 211 in S214 (N of S124), the search further continues for unused AUs (S132), and any arbitrary chosen "unused" block among the AU obtained as a result of the search is assigned to an object to be recorded (S134). Subsequently, the AU usage status information column 232 of the AU management table 211 corresponding to this AU is changed to "NRT partially used" (S136) so as to write the data (S138). In this manner, the non-real time data is recorded by preferentially using the partially used AU. Thus, the non-real time data can be recorded in a manner such that as much unused AU as possible, which is usable at the later time when the real time data is to be recorded, remains as such.

After the writing of data is completed, the start address as well as the size of the data-written region is added to an allocation descriptor of the file management information 212 (S142), then an entry corresponding to the data-written block is updated to "1" indicating being "in use" (S142). Next, it is judged whether any data to be recorded still remains or not (S144); if the data to be recorded still exists (Y of S144), the procedure is returned to S124 and repeats the processing which records the data to the block obtained by the search. If data to be recorded is no longer left (N of S144), the file is closed (S146) and the processing is terminated.

Figure 7:
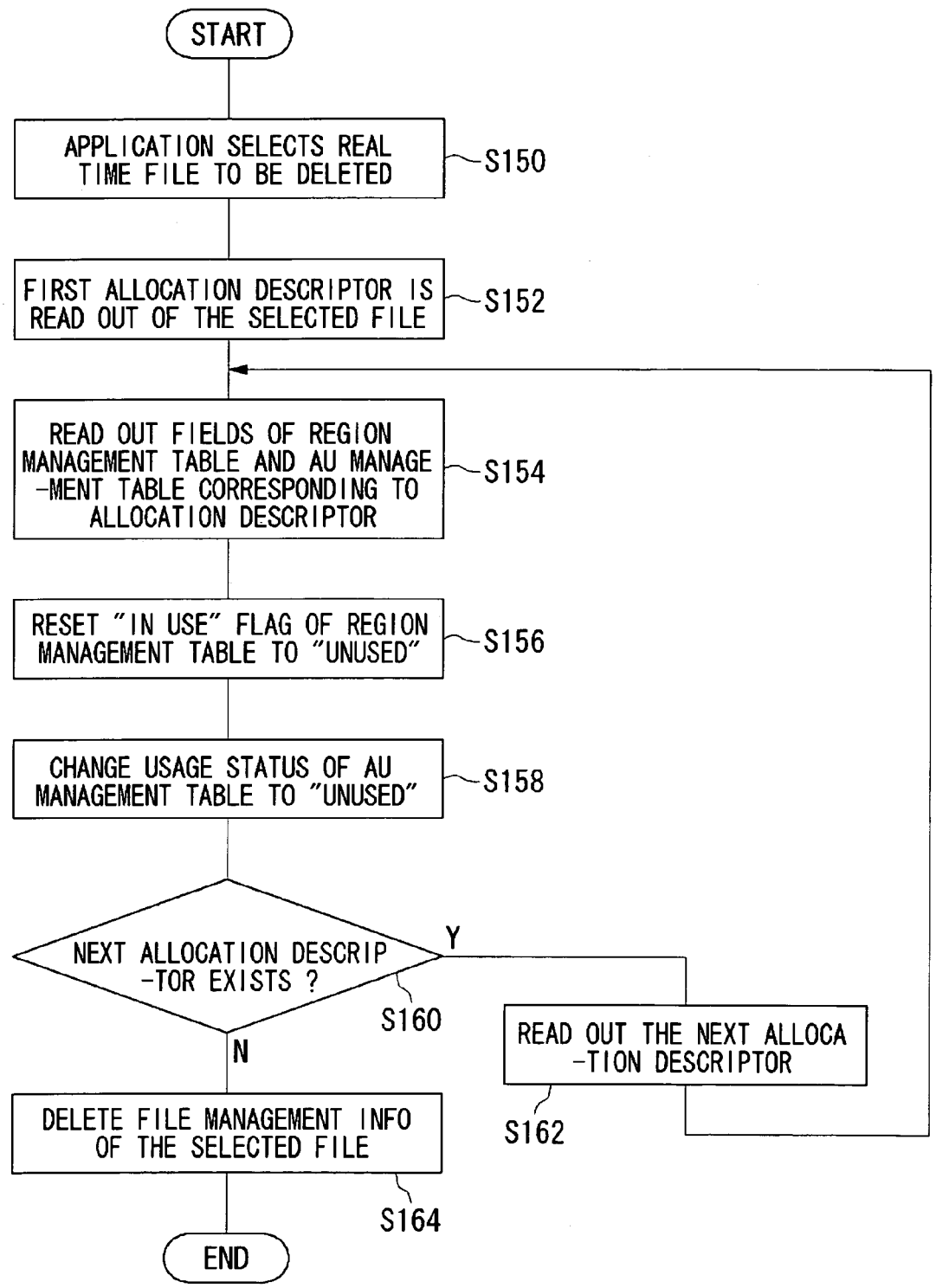
FIG. 7 is a flowchart showing a procedure of deleting real time data in a digital recording/reproducing apparatus according to the present embodiment.

FIG. 7 is a flowchart showing a procedure of deleting real time data in the digital recording/reproducing apparatus according to the present embodiment. First, when application selects a real time file to be deleted (S150), a first allocation descriptor is read out among the file management information 212 of the selected file (S152). The HDD controller module 117 reads out the field corresponding to the block thereof by referring to the region management table 210, and at the same time reads out the field corresponding to the AU containing said block by referring to the AU management table 211 (S154). Then, the field of the region management table 210 is reset to "0" that indicates being "unused" (S156), and the AU usage status information column 232 of the AU management table 211 is accordingly changed to "unused" (S158). Subsequently, it is judged whether a next allocation descriptor exists or not (S160); if any allocation descriptor still remains (Y of S160), the allocation descriptor is read out (S162) and the procedure is returned to S154 so as to again update the region management table 210 and the AU management table 211. If no allocation descriptor is left (N of S160), the file management information 212 of the selected file is deleted (164) and the processing is terminated.

Figure 8:
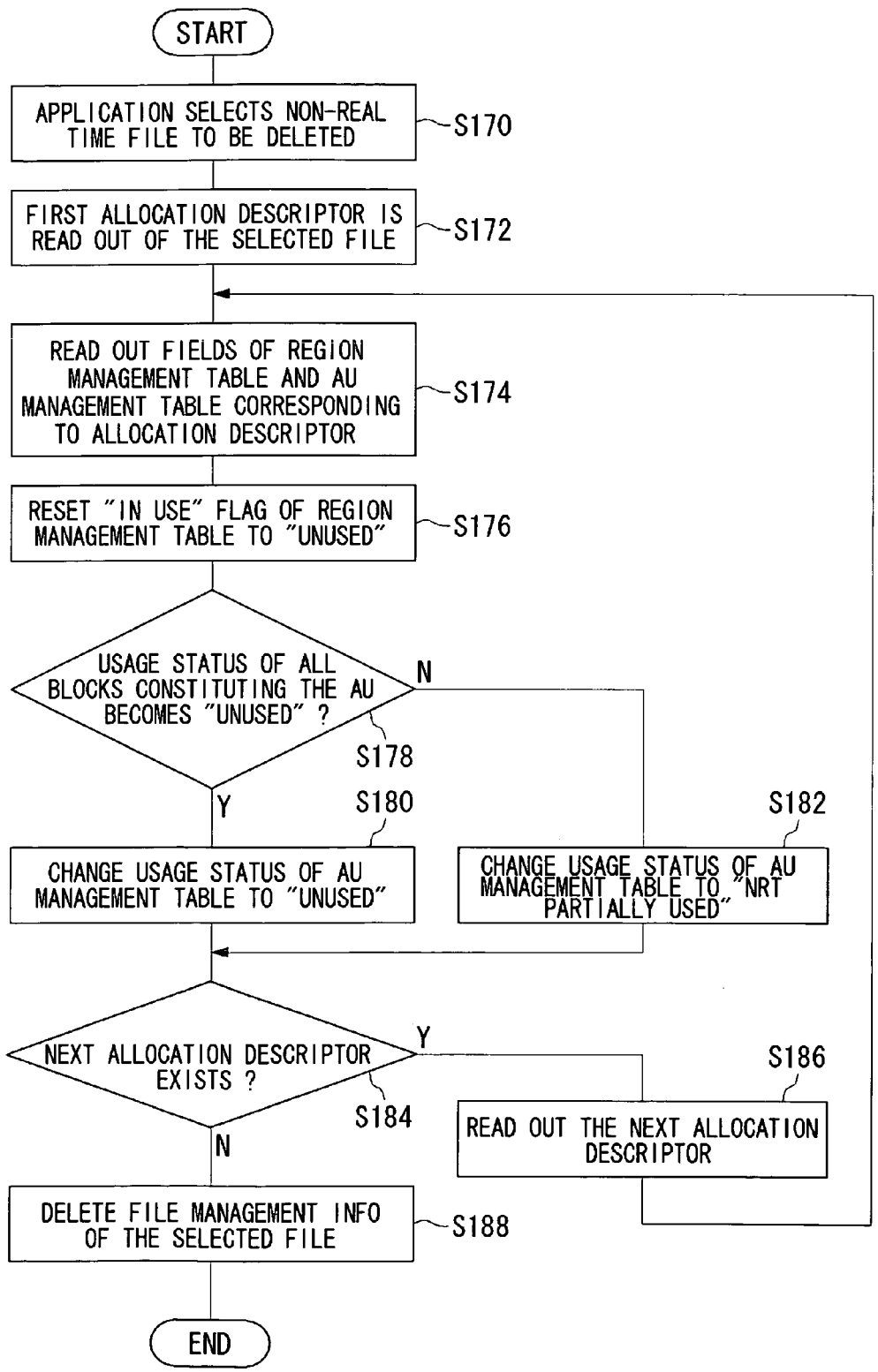
FIG. 8 is a flowchart showing a procedure of deleting non-real time data in a digital recording/reproducing apparatus according to the present embodiment.

FIG. 8 is a flowchart showing a procedure of deleting non-real time data in the digital recording/reproducing apparatus according to the present embodiment. First, when application selects a non-real time file to be deleted (S170), a first allocation descriptor is read out among the file management information 212 of the selected file (S172). The HDD controller module 117 reads out the field corresponding to the block thereof by referring to the region management table 210, and at the same time reads out the field corresponding to the AU containing said block by referring to the AU management table 211 (S174). Then, the field of the region management table 210 is reset to "0" that indicates being "unused" (S176). If the status of all blocks of AU containing the block become "unused" (Y of S178) by having the status of this block become "unused", the AU usage status information column 232 of the AU management table 211 is accordingly changed to "unused" (S180). If there remains any block "in use" in the AU (N S178), the AU usage status information column 232 of the AU management table 211 is changed to "NRT partially used". If the AU usage status information column indicates "NRT partially used" already, then no change needs to be made. Subsequently, it is judged whether a next allocation descriptor exists or not (S184); if any allocation descriptor still remains (Y of S184), the allocation descriptor is read out (S186) and the procedure is returned to S174 so as to again update the region management table 210 and the AU management table 211. If no allocation descriptor is left (N of S184), the file management information 212 of the selected file is deleted (188) and the processing is terminated.

As described above, the procedures of recording and deleting the data have been explained with reference to FIG. 5 to FIG. 8. According to the present embodiment, every time the usage status changes due to the recording and deletion of data, the synchronism is retained by properly updating the AU management table 211. Thus, unused AUs can be rapidly searched by referring to the AU management table 211 when the real time data is to be recorded.

Next, described is a processing to be performed in a case when the data is recorded, to an HDD 118 having the AU management table 211, by a recording apparatus which does not support the AU management table 211.

Figure 9:
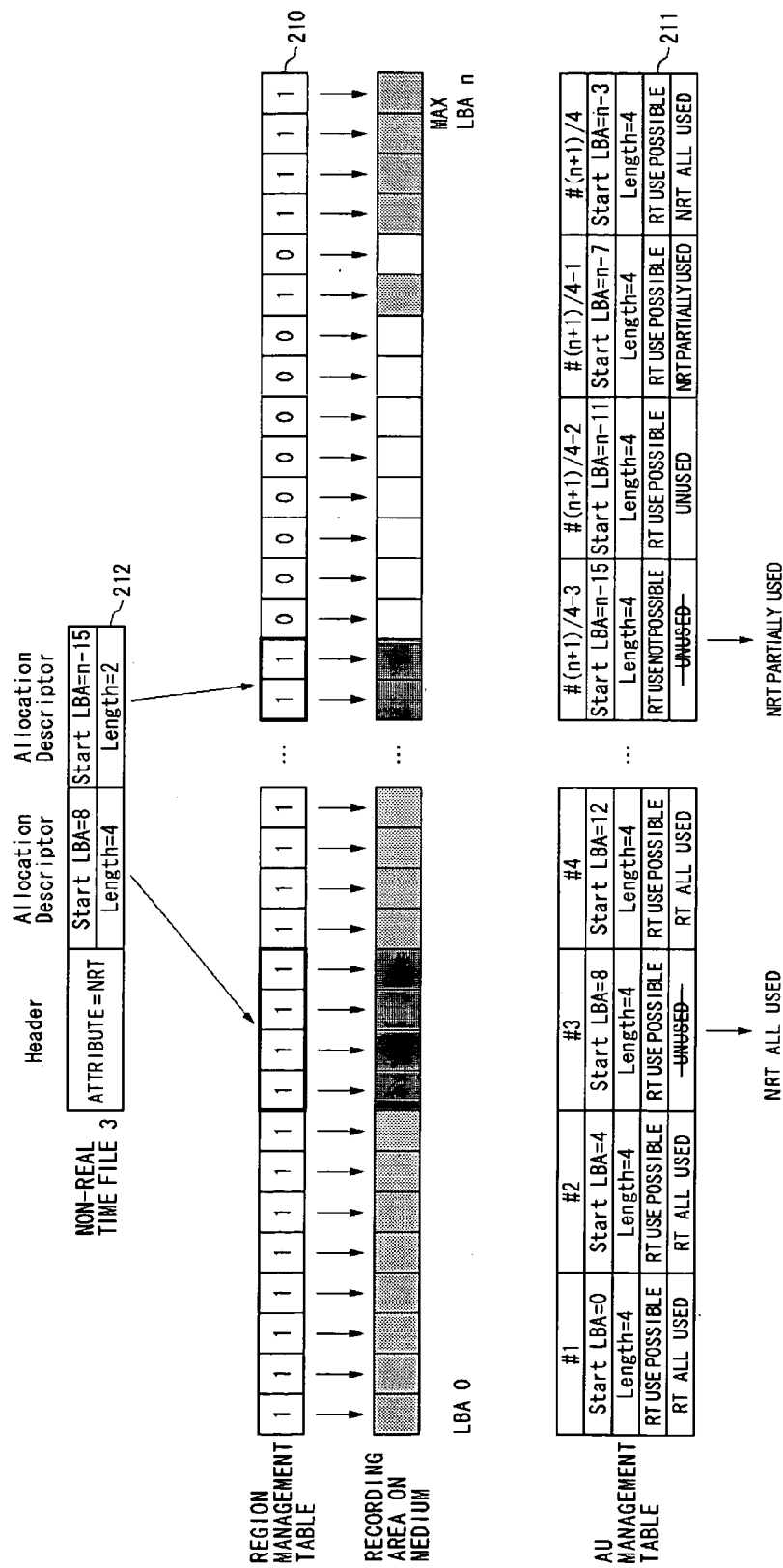
FIG. 9 illustrates how data is recorded by a recording apparatus which does not comply with an AU management table.

FIG. 9 illustrates how the data is recorded by a recording apparatus which does not comply with the AU management table (hereinafter simply referred to as "unsupported recording apparatus"). On the other hand, the digital recording/reproducing apparatus according to the present embodiment will be hereinafter called, for convenience, "supported recording apparatus" also. When the non-real time file 3 is to be recorded, the unsupported recording apparatus seeks for unused blocks by referring to the region management table 210. Here, four blocks whose start LBA is 8 and two blocks whose start LBA is n-15 are unused, and the non-real time file 3 is recorded to these blocks. When the recording is done successfully, the unsupported recording apparatus sets to "1" indicating being "in use" the entry of the block corresponding to the region management table 210, but does not update the AU management table 211. As a result, although the actual usage status of the AU with the AU number 3 has been changed to "NRT all used", the usage status indicated by the AU management table 211 remain "unused", thus causing mismatching and inconsistency therebetween.

According to the present embodiment, in order to correct such inconsistency, the contents of the region management table 210 and the contents of the AU management table 211 are compared to each other and verified so as to reconstruct the AU management table 211. Namely, the usage status of blocks included in each of all AUs is checked for all AUs and if there is any error in the AU usage status information column 232, then the error will be corrected. Since such correction processing takes relatively long time, it is not efficient if the processing is performed every time the HDD 118 is connected to the supported recording apparatus. Thus, according to the present embodiment, there is provided a mechanism by which to detect whether the recording by the unsupported apparatus was done or not. In this scheme, the AU management table 211 is reconstructed as described above only if it is detected that the recording by the unsupported recording apparatus has been made when the HDD 118 is connected to the supported recording apparatus.

In the UDF, if modification is made within the logical volume, an "implementation ID" (see the UDF specification 2.2.6.4) is recorded within the "implementation use" of the "logical volume integrity descriptor" (see the UDF specification 2.2.6). In this "implementation ID", the "developer ID" is to be recorded and, in general, the name of a manufacturer is to be recorded therein. In the present embodiment, whether the recording is done by an unsupported recording apparatus or not is detected using this "developer ID".

When the recording is done by a supported recording apparatus, a specific character string by which to indicate the supported apparatus is added to the manufacturer name, as a "developer ID". When the supported recording apparatus performs the recording or deletion, a rule may be set such that the character string "-iVDR" is added to the tail of the "developer ID". For example, if a supported recording apparatus "HDDPLayer" is manufactured by the XYZ company, then the "developer ID" will be "XYZHDDPlayer-iVDR". In contrast, when an unsupported recording apparatus performs the recording, this character string will not be added. Thus, whether an apparatus that last performed the recording is an unsupported apparatus or not can be detected by reading the "developer ID" and verifying whether or not there is the specific character string added to the "developer ID".

When the apparatus to which the modification is added immediately before the current use is an unsupported recording apparatus, the AU management table 211 will be reconstructed. When the apparatus to which the modification is added immediately before the current use is a supported recording apparatus, there is no need to reconfigure the AU management table 211 for the supported recording apparatus must have already corrected any inconsistency caused then if any. Namely, it suffices to verify whether the apparatus to which the modification is made immediately before the current use is an unsupported or supported apparatus.

Figure 10:
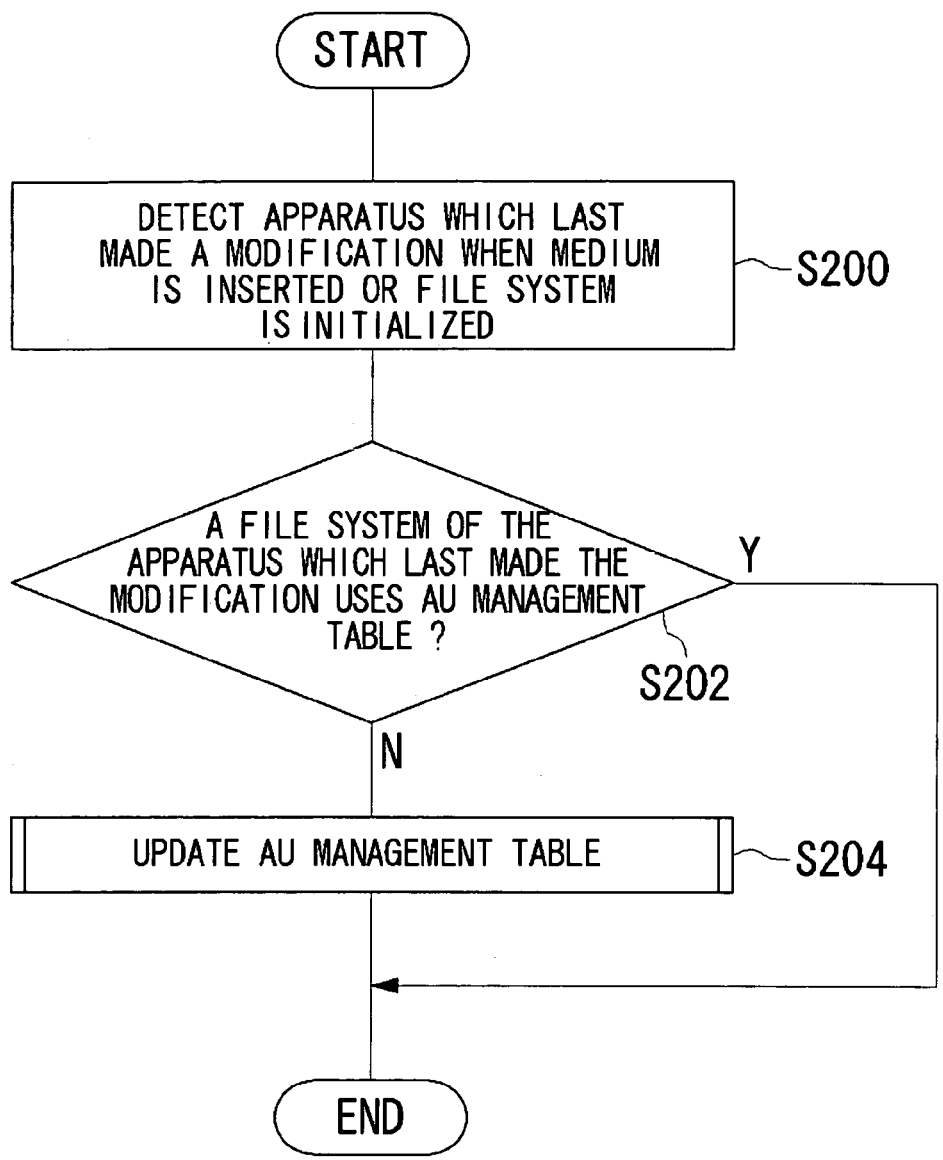
FIG. 10 is a flowchart showing a processing procedure taken when an HDD is connected to a digital recording/reproducing apparatus according to the present embodiment.

FIG. 10 is a flowchart showing a processing procedure taken when an HDD is connected to a digital recording/reproducing apparatus according to the present embodiment. When an HDD 118 is inserted or a file system is initialized by restarting the digital recording/reproducing apparatus and so forth, the HDD controller module 117 reads out the "developer ID" to verify whether or not there is a specific character string attached thereto and detects apparatus which last made a modification (S200). If the apparatus which last made the modification is an unsupported recording apparatus (N of S202), the AU management table 211 is reconstructed (S204). If the apparatus which last made the modification is a supported recording apparatus (Y of S202), the processing is terminated without reconfiguring the AU management table 211.

Figure 11:
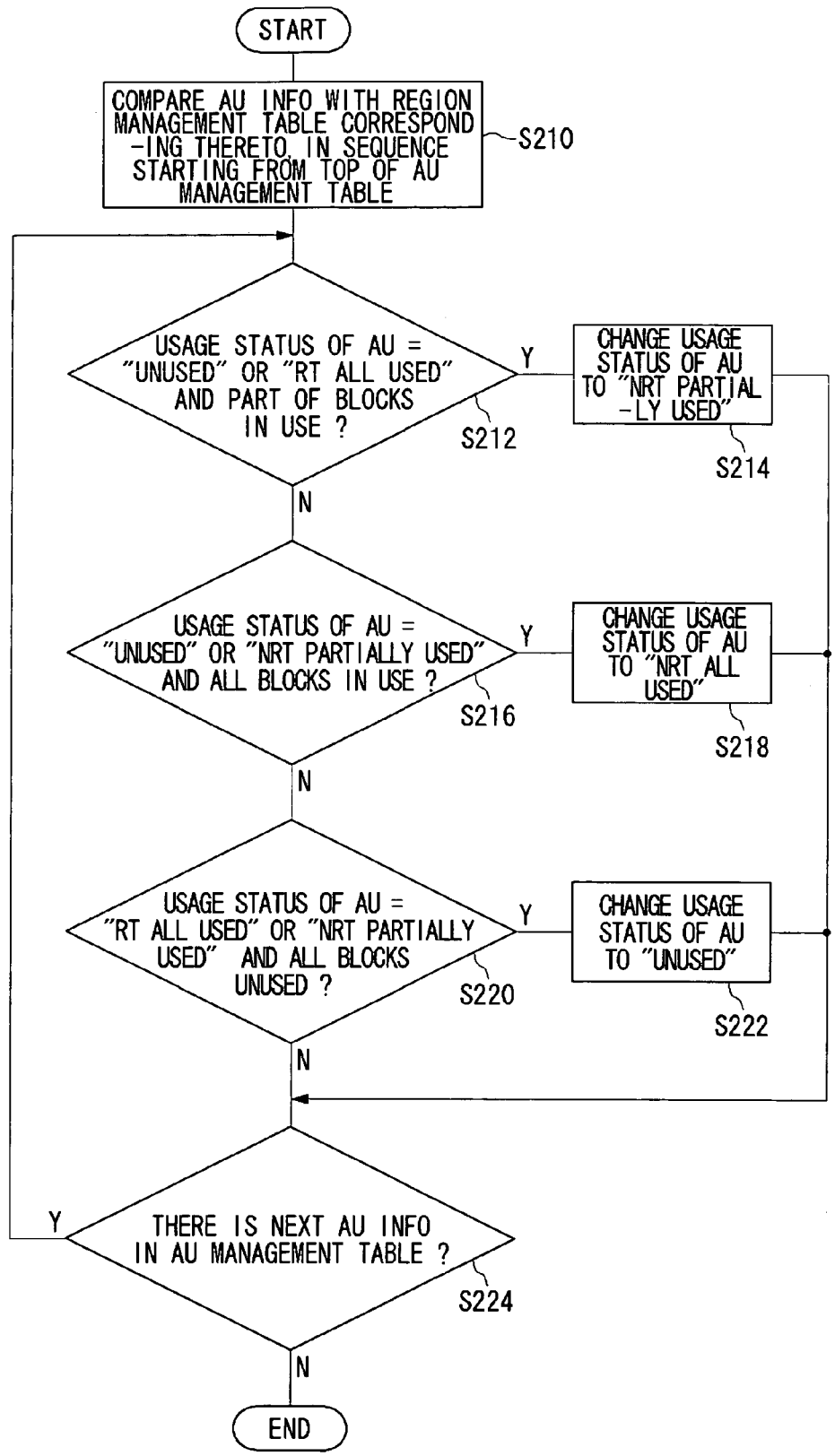
FIG. 11 is a flowchart showing a procedure of reconstructing an AU management table.

FIG. 11 is a flowchart showing a procedure of reconstructing the AU management table 211. The HDD controller module 117 reads out the AU management table 211 and the region management table 210, and compares AU usage state information of the AU information column 222 with the usage status of a block corresponding to the AU state information thereof in sequence starting from the top of the AU information column 222 so as to check if there is any inconsistency therebetween (S210). If the AU usage status is either "unused" or "RT all used" and part of the block included in the AU is in use (Y of S212), the data recorded in that block must be non-real time data and therefore the AU usage status is modified to "NRT partially used" (S214).

If the AU usage status is "unused" or "NRT partially used" and all of blocks included in the AU are in use (Y of S216), the AU usage status is modified to "NRT all used" (S218). This is because the data that the unsupported recording apparatus records are all non-real time data. If the AU usage status is "RT all used" or "NRT partially used" and all of blocks included in the AU are unused (Y of S220), the AU usage status is modified to "unused" (S222). If the usage status does not correspond to any of the steps S212, S216 and S220 above, it means that the consistency between the AU usage status and the AU management table 211 is kept, and therefore the AU usage status will not be changed. If there is another AU information in the AU management table 211 (Y of S224), the procedure is returned to S212 so as to check the consistency again. The above processing is repeated for all of the AUs.

Figure 12:
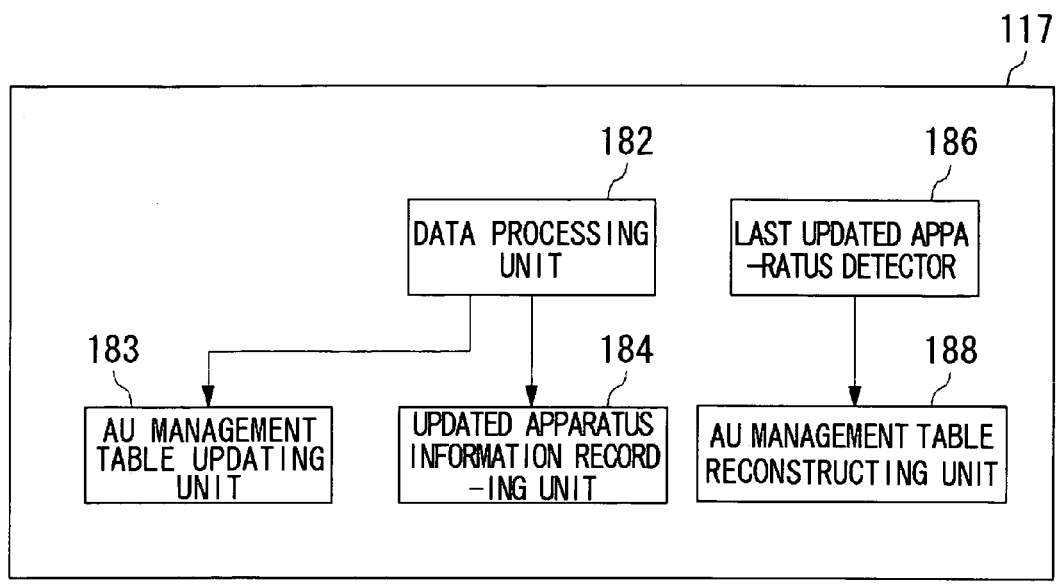
FIG. 12 shows function blocks to realize the above-described recording method in the recording/reproducing apparatus of the present embodiment.

FIG. 12 shows function blocks to realize the above-described recording method in the recording/reproducing apparatus according to the present embodiment. These functions can be realized mainly by the HDD controller module 117. Thus, in terms of hardware, the structure therefor can be realized by a CPU, a memory and so forth of a computer. In terms of software, it is realized by programs having recording-control functions or the like, but drawn and described here are function blocks that are realized in cooperation with those. Thus, it is understood by those skilled in the art that these functional blocks can be realized in a variety of forms by hardware only, software only or the combination thereof. The above description has been given on condition that these functions are performed by the HDD controller module 117. However, each of such functions is realized by respective function blocks shown in FIG. 12.

A data processing unit 182 controls writing and reading of data to and from an HDD 118. Specifically, the data processing unit 182 performs processings involved with the reproduction of the real time data and reading of the non-real time data and so forth, in addition to the recording and deletion of the data as illustrated in FIG. 5 to FIG. 8. When the usage status of a unit is changed as a result of a processing by the data processing unit 182, an AU management table updating unit 183 updates a field corresponding to said unit in the AU management table 211. When the data processing unit updates the contents of the HDD 118, an updated apparatus information recording unit 184 records this update result in a "developer ID" within the file management information 212 by adding to the "developer ID" a specific character string indicating that the supported recording apparatus has updated the contents. When an HDD 118 is inserted or a file system is initialized by restarting the digital recording/reproducing apparatus and so forth, a last updated apparatus detector 186 reads out the "developer ID" to verify whether or not there is a specific character string attached thereto and detects apparatus which last made a modification. If the apparatus which last made the modification is an unsupported recording apparatus, an AU management table reconstructing unit 188 reconstructs the AU management table 211 by performing processings shown in FIG. 11.

According to the present embodiment, the real time data can be quickly recorded by managing the recording region for each unit. An unused unit or units which can store real time data can also be quickly searched. Moreover, even if the data is recorded or deleted by a recording apparatus which does not support the above method, such data is detected appropriately and then the AU management table is reconfigured so as to retain the consistency thereof.

The present invention has been described based on the embodiment which is only exemplary. It is understood by those skilled in the art that there exist other various modifications to the combination of each component and process described above and that such modifications are encompassed by the scope of the present invention.

In the above embodiment, the description thereof has been given of the digital recording/reproducing apparatus that records and reproduces the MPEG data, as an example. The present invention may further be widely applied to a digital recording/reproducing apparatus that records and reproduces audio data only, a recording/reproducing apparatus that records and reproduces data obtained via the Internet and so forth. Moreover, the modification may be made to the update timing of the metadata, structuring timing of the metadata file and so forth.

Though the present embodiment has been described based on the hard disk as an example, but they are not limited thereto. The present embodiment may further be applied to CDs, DVDs, MOs, semiconductor memories, other arbitrary recording and storage media and so forth, and the methods according to the present embodiment may be applied also to a case where data is recorded on the recording media such as one capable of being randomly accessed, in particular.

Although the present invention has been described by way of exemplary embodiments, it should be understood that many changes and substitutions may further be made by those skilled in the art without departing from the scope of the present invention which is defined by the appended claims.

What is claimed is:

1. A recording control apparatus, comprising:
a processing unit for writing or deleting data on a recording medium having a unit management table for managing usage status of units of a recording region, each unit having a predetermined size with contiguous logical addresses;
an updating unit which updates the unit management table in the event that the usage status of the unit is changed by the writing or deleting the data performed by said processing unit;
an updated apparatus information recording unit which records, on the recording medium, apparatus information indicating that an apparatus having performed the writing or deleting the data has a function of updating the unit management table;
a detector which detects, when connected to the recording medium, whether an apparatus that last performed the writing or deleting the data has the function of updating the unit managing table or not by reading out the apparatus information recorded by said updated apparatus information recording unit; and
a reconstructing unit which reconstructs the unit management table if the apparatus that last performed the writing or deleting the data does not have the function of updating the unit management table.

2. A recording control apparatus according to claim 1, wherein said reconstructing unit reconstructs the unit management table by referring to actual usage status of the recording region.

3. A recording control apparatus according to claim 2, wherein the size of the unit is determined based on performance of the recording medium so that a processing of data, where continuous write or read thereof in time is required, is performed without any loss of data continuity incurred during the continuous write or read operations.

4. A recording control apparatus according to claim 3, wherein, when data requiring continuous write are to be recorded, said processing unit detects an unused unit by referring to the unit management table and records the data in the unused unit.

5. A recording control apparatus according to claim 3, wherein the recording medium is a hard disk and each unit comprises a plurality of blocks in which data are input and output, each block having continuous logical addresses.

6. A recording control apparatus according to claim 5, wherein the recording medium further includes a region management table for managing usage status of the blocks, and wherein said reconstructing unit reconstructs the unit management table in a manner such that the usage status of the blocks of a respective unit is obtained by referring to the region management table.

7. A recording control apparatus according to claim 2, wherein, when data requiring continuous write are to be recorded, said processing unit detects an unused unit by referring to the unit management table and records the data in the unused unit.

8. A recording control apparatus according to claim 2, wherein the recording medium is a hard disk and each unit comprises a plurality of blocks in which data are input and output, each block having continuous logical addresses.

9. A recording control apparatus according to claim 8, wherein the recording medium further includes a region management table for managing usage status of the blocks, and wherein said reconstructing unit reconstructs the unit management table in a manner such that the usage status of the blocks of a respective unit is obtained by referring to the region management table.

10. A recording control apparatus according to claim 1, wherein the size of the unit is determined based on performance of the recording medium so that a processing of data, where continuous write or read thereof in time is required, is performed without any loss of data continuity incurred during the continuous write or read operations.

11. A recording control apparatus according to claim 10, wherein, when data requiring continuous write are to be recorded, said processing unit detects an unused unit by referring to the unit management table and records the data in the unused unit.

12. A recording control apparatus according to claim 10, wherein the recording medium is a hard disk and each unit comprises a plurality of blocks in which data are input and output, each block having continuous logical addresses.

13. A recording control apparatus according to claim 12, wherein the recording medium further includes a region management table for managing usage status of the blocks, and wherein said reconstructing unit reconstructs the unit management table in a manner such that the usage status of the blocks of a respective unit is obtained by referring to the region management table.

14. A recording control apparatus according to claim 1, wherein, when data requiring continuous write are to be recorded, said processing unit detects an unused unit by referring to the unit management table and records the data in the unused unit.

15. A recording control apparatus according to claim 14, wherein the recording medium is a hard disk and each unit comprises a plurality of blocks in which data are input and output, each block having continuous logical addresses.

16. A recording control apparatus according to claim 15, wherein the recording medium further includes a region management table for managing usage status of the blocks, and wherein said reconstructing unit reconstructs the unit management table in a manner such that the usage status of the blocks of a respective unit is obtained by referring to the region management table.

17. A recording control apparatus according to claim 1, wherein the recording medium is a hard disk and each unit comprises a plurality of blocks in which data are input and output, each block having continuous logical addresses.

18. A recording control apparatus according to claim 17, wherein the recording medium further includes a region management table for managing usage status of the blocks, and wherein said reconstructing unit reconstructs the unit management table in a manner such that the usage status of the blocks of a respective unit is obtained by referring to the region management table.

19. A recording control method, including:

writing data to or deleting data from a recording medium having a unit management table recorded thereon, for managing usage status of units of a recording region, each unit having a predetermined size with contiguous logical addresses;

updating the unit management table in the event that the usage status of the unit is changed by said writing or deleting;

recording, on the recording medium, information indicating that the unit management table has been updated;

reading out, prior to using the recording medium, the information recorded in said recording, and detecting whether an apparatus that last performed said writing or deleting has updated the unit management table or not; and reconstructing the unit management table if the apparatus that last performed said writing or deleting has not updated the unit management table.

* * * * *

UNITED STATES PATENT AND TRADEMARK OFFICE
CERTIFICATE OF CORRECTION

PATENT NO. : 7,058,770 B2
APPLICATION NO. : 10/675994
DATED : June 6, 2006
INVENTOR(S) : Yuichi Kanai et al.

It is certified that error appears in the above-identified patent and that said Letters Patent is hereby corrected as shown below:

On the Title page

Item "(56) References Cited, FOREIGN PATENT DOCUMENTS", change "JP 11-134238" to -- JP 11-134236 --

Signed and Sealed this

Thirty-first Day of October, 2006

JON W. DUDAS
*Director of the United States Patent and Trademark Office*